US008441957B2

(12) United States Patent
Baumer et al.

(10) Patent No.: US 8,441,957 B2
(45) Date of Patent: May 14, 2013

(54) APPARATUS AND METHOD OF REMOTE PHY AUTO-NEGOTIATION

(75) Inventors: Howard A. Baumer, Laguna Hills, CA (US); Scott McDaniel, Villa Park, CA (US); Gary S. Huff, Laguna Hills, CA (US); John Louie, Huntington Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1371 days.

(21) Appl. No.: 11/272,148

(22) Filed: Nov. 14, 2005

(65) Prior Publication Data

US 2007/0086450 A1    Apr. 19, 2007

Related U.S. Application Data

(60) Provisional application No. 60/726,661, filed on Oct. 17, 2005.

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G06F 15/173 | (2006.01) |

(52) U.S. Cl.
USPC .......................................... 370/254; 709/223

(58) Field of Classification Search .................. 709/223
See application file for complete search history.

(56) References Cited

U.S. PATENT DOCUMENTS

| 6,859,825 B1 * | 2/2005 | Williams .......................... 709/220 |
| 2002/0048270 A1 * | 4/2002 | Allen et al. .................... 370/392 |

(Continued)

FOREIGN PATENT DOCUMENTS

| EP | 1 686 724 A2 | 8/2006 |
| GB | 2 359 222 A | 8/2001 |

OTHER PUBLICATIONS

IEEE 802.3-2000 Specification, Oct. 18, 2000, The Institute of Electical and Electronics Engineers, pp. 508, 711, 1128 and 1361.*

(Continued)

*Primary Examiner* — John Blanton
*Assistant Examiner* — Christopher Crutchfield
(74) *Attorney, Agent, or Firm* — Sterne, Kessler, Goldstein & Fox P.L.L.C.

(57) ABSTRACT

A communications network includes a management device and a remote device. The remote device includes a physical layer device (PHY) coupled to a link partner. An independent station manager of the remote device provides the bi-directional exchange of management information between the PHY and a serial-to-parallel (S/P) interface connecting the remote device and the management device. A station manager of the management device provides the bi-directional exchange of management information between the S/P interface and a Media Access Controller (MAC) of the management device. The independent station manager and the station manager transmit initiation messages, formatted according to a message template of an Auto-Negotiation (AN) routine of the S/P interface reserved for customization, to reserve an embedded management channel for the transfer of management information. Management information messages, formatted according to a message template of the AN routine, are subsequently exchanged, thereby providing Auto-Negotiation of the PHY.

30 Claims, 12 Drawing Sheets

U.S. PATENT DOCUMENTS

| | | | | |
|---|---|---|---|---|
| 2003/0161348 | A1* | 8/2003 | Mills et al. | 370/509 |
| 2004/0103198 | A1* | 5/2004 | Kim et al. | 709/227 |
| 2004/0141497 | A1* | 7/2004 | Amirichimeh et al. | 370/362 |
| 2004/0161235 | A1* | 8/2004 | Halgren et al. | 398/45 |
| 2005/0097378 | A1* | 5/2005 | Hwang | 713/320 |
| 2005/0111531 | A1* | 5/2005 | Booth et al. | 375/219 |
| 2005/0135421 | A1* | 6/2005 | Chang et al. | 370/474 |
| 2005/0198260 | A1* | 9/2005 | Shahdadpuri et al. | 709/224 |

OTHER PUBLICATIONS

Author Unknown, IEEE 802.3-2000 Specification, Oct. 18, 2000, The Institute of Electrical and Electronics Engineers, p. 508, 711, 1128 and 1361.*

Author Unknown, The Authoratative Dictonary of IEEE Standards Terms, Seventh Edition, p. 288, 2000.*

Partial European Search Report for Application No. EP 06 01 4375, dated Jan. 22, 2007, 4 pages.

"Part 3: Carrier Sense Multiple Access with Collision Detection (CSMA/CD) Access Method and Physical Layer Specifications," IEEE 802 and IEEE 802.3, Jan. 1, 2005, pp. 1-7 and 79-100.

Information technology—Telecommunications and information exchange between systems—Local and metropolitan area networks—Specific requirements, "Supplement to Carrier Sense Multiple Access with Collision Detection (CSMA/CD) Access Method and Physical Layer Specifications—Physical Layer Parameters and Specifications for 1000 Mb/s Operation Over 4-Pair of Category 5 Balanced Copper Cabling, Type 1000BASE-T", IEEE Std 802.3ab-1999 (Supplement to IEEE Std 802.3, 1998 Edition), 140 pages.

IEEE Standards for Local and Metropolitan Area Networks: Supplement to Carrier Sense Multiple Access with Collision Detection (CSMA/CD) Access Method and Physical Layer Specifications, "Media Access Control (MAC) Parameters, Physical Layer, Medium Attachment Units, and Repeater for 100 Mb/s Operation, Type 100BASE-T (Clauses 21-30)", IEEE Std 802.3u-1995 (Supplement to ISO/IEC 8802-3: 1993 [ANSI/IEEE Std 802.3, 1993 Edition]), 415 pages.

IEEE Standard for Information technology—Telecommunications and information exchange between systems—Local and metropolitan area networks—Specific requirements, "Part 3: Carrier sense multiple access with collision detection (CSMA/CD) access method and physical layer specifications," IEEE Std 802.3™-2005 (Revision of IEEE Std 802.3-2002 including all approved amendments), 628 pages.

Information technology—Telecommunications and information exchange between systems—Local and metropolitan area networks—Specific requirements, "Part 3: Carrier Sense Multiple Access with Collision Detection (CSMA/CD) access method and physical layer specifications," Section Two: This section includes Clause 21 through Clause 33 and Annex 22A through Annex 32A, 810 pages.

Information technology—Telecommunications and information exchange between systems—Local and metropolitan area networks—Specific requirements, "Part 3: Carrier Sense Multiple Access with Collision Detection (CSMA/CD) access method and physical layer specifications," Section Three: This section includes Clause 34 through Clause 43 and Annex 36A through Annex 43C, 387 pages.

Information technology—Telecommunications and information exchange between systems—Local and metropolitan area networks—Specific requirements, "Part 3: Carrier Sense Multiple Access with Collision Detection (CSMA/CD) access method and physical layer specifications," Section Four: This section includes Clause 44 through Clause 54 and Annex 44A through Annex 50A, 454 pages.

Information technology—Telecommunications and information exchange between systems—Local and metropolitan area networks—Specific requirements, "Part 3: Carrier Sense Multiple Access with Collision Detection (CSMA/CD) access method and physical layer specifications," Section Five: This section includes Clause 56 through Clause 67 and Annex 58A through Annex 67A, 417 pages.

Author Unknown, IEEE 802.3-2000 Specification, Oct. 18, 2000, The Institute of Electrical and Electronics Engineers, pp. 509, 698-711, 1361.

* cited by examiner

APPARATUS AND METHOD OF REMOTE PHY AUTO-NEGOTIATION

CROSS REFERENCE TO RELATED APPLICATIONS

This application claims the benefit of U.S. Provisional Patent Application No. 60/726,661, filed Oct. 17, 2005, which is incorporated herein by reference in its entirety.

BACKGROUND OF THE INVENTION

1. Field of the Invention

The present invention generally relates to network management. More specifically, the present invention provides the exchange of management information between a local network management device and a remote physical layer device (PHY).

2. Background Art

A communications network uses Auto-Negotiation to foster the exchange of management information between a network management device and a network device. An Auto-Negotiation routine enables the network management device to monitor and adjust the abilities of the network device to ensure proper or improved operation. In turn, the performance of the communications network is maintained or improved.

Typically, the network management device requires a direct connection to the network device to adjust the operation of the network device. Alternatively, an indirect connection to the network device can provide the required level of connectivity for efficient management. The indirect connection relies on the bi-directional exchange of management information through one or more intermediate network elements to provide connectivity.

A remote network device having a remote PHY lacks a direct connection to the network management device. Further, a communication interface connecting the remote network device to the network management device fails to provide the bi-directional exchange of management information between the remote PHY and the network management device. Deprived of either a direct or indirect connection to the remote PHY, management information exchanged by the remote PHY and a remote link partner is not delivered to the network management device. As a result, the network management device is incapable of monitoring and adjusting the capabilities of the remote PHY. Consequently, the overall performance of the communications network suffers.

BRIEF SUMMARY OF THE INVENTION

Accordingly, the present invention is directed to a communications network that provides remote PHY Auto-Negotiation.

A communications network includes a local network management device and a remote network device. The remote network device includes a remote physical layer device (PHY) coupled to a remote link partner. An independent station manager module of the remote network device provides the bi-directional exchange of management information between the remote PHY and a communications interface connecting the remote network device and the local network management device. A local station manager module of the local network management device provides the bi-directional exchange of management information between the communications interface and a Media Access Controller (MAC) of the local network management device.

The independent station manager module and the station manager module transmit communication messages to reserve an embedded management channel for the transfer of management information over the communications interface. The communication messages are formatted according to a message template of the Auto-Negotiation (AN) routine of the communication interface. Management information messages, also formatted according to the message template of the AN routine, are subsequently exchanged, thereby providing the exchange of management information between the remote PHY and the local station manager module. In turn, Auto-Negotiation of the PHY is accommodated.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

Figure 5:
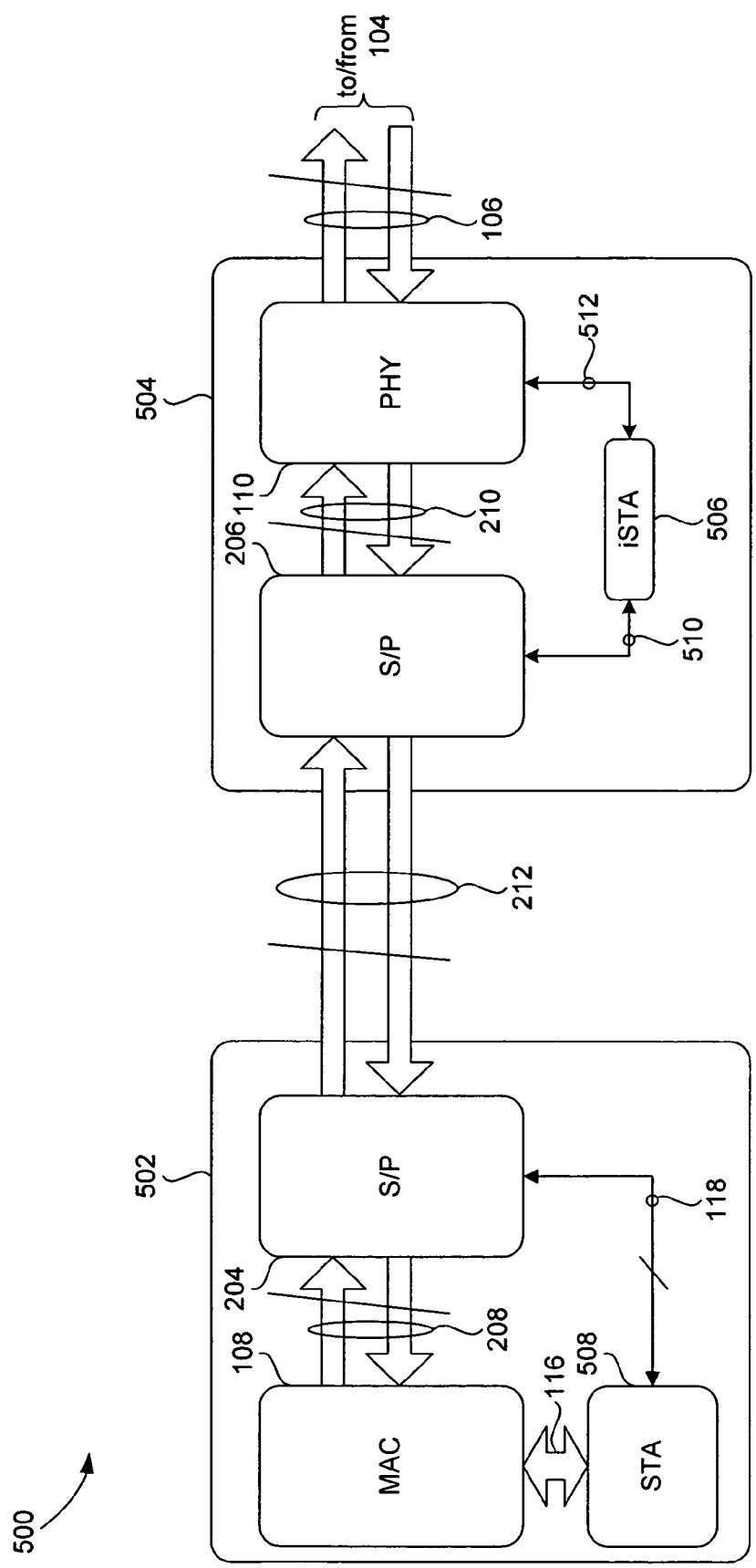
FIG. 5 illustrates a communications network of the present invention that provides remote PHY Auto-Negotiation.
Figure 12:
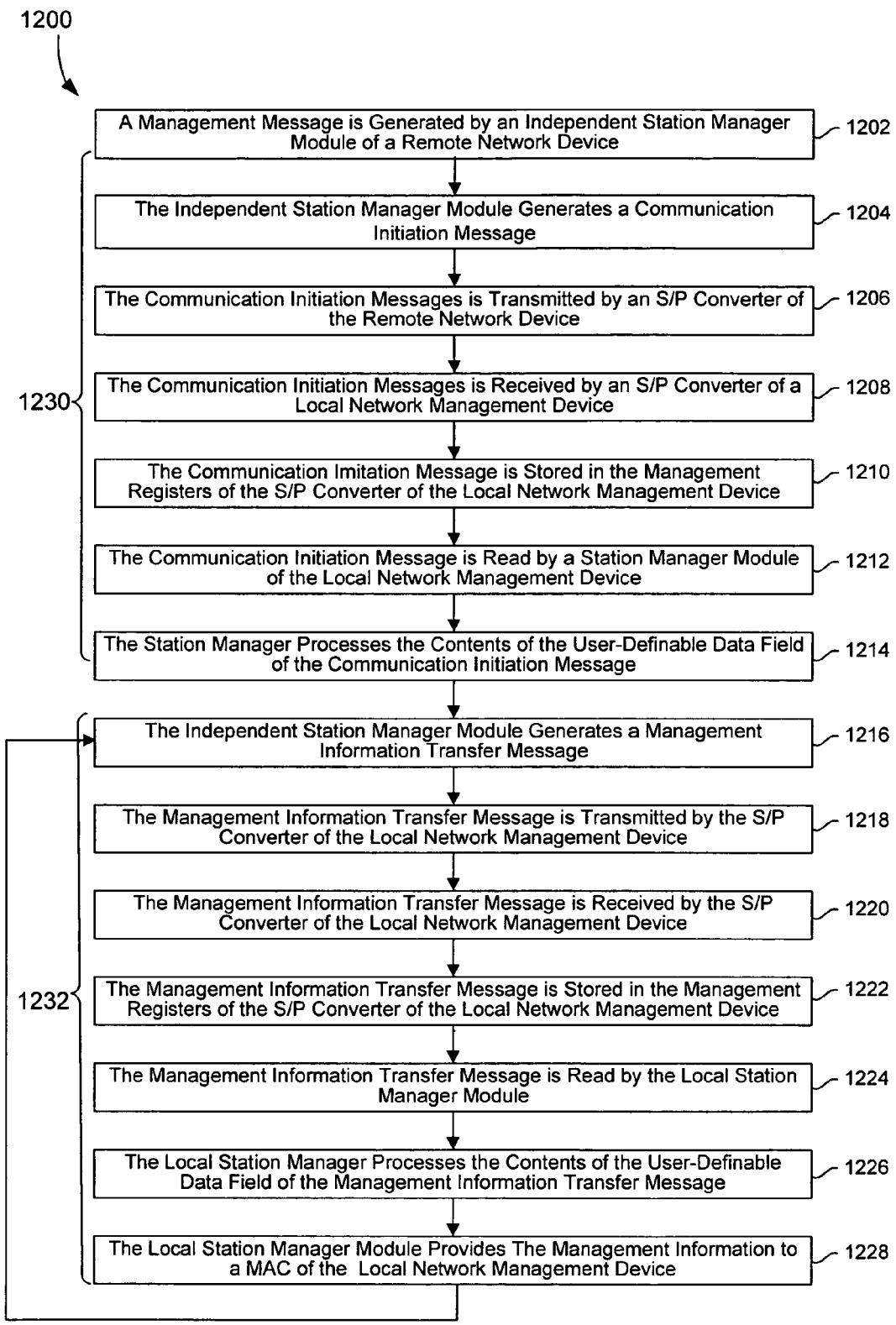

FIG. 12 provides a flowchart that illustrates operational steps corresponding to FIG. 5 (or FIG. 6) for using the management interface of the present invention to deliver management information from a remote PHY to a local network management device.

DETAILED DESCRIPTION OF THE INVENTION

Figure 1:
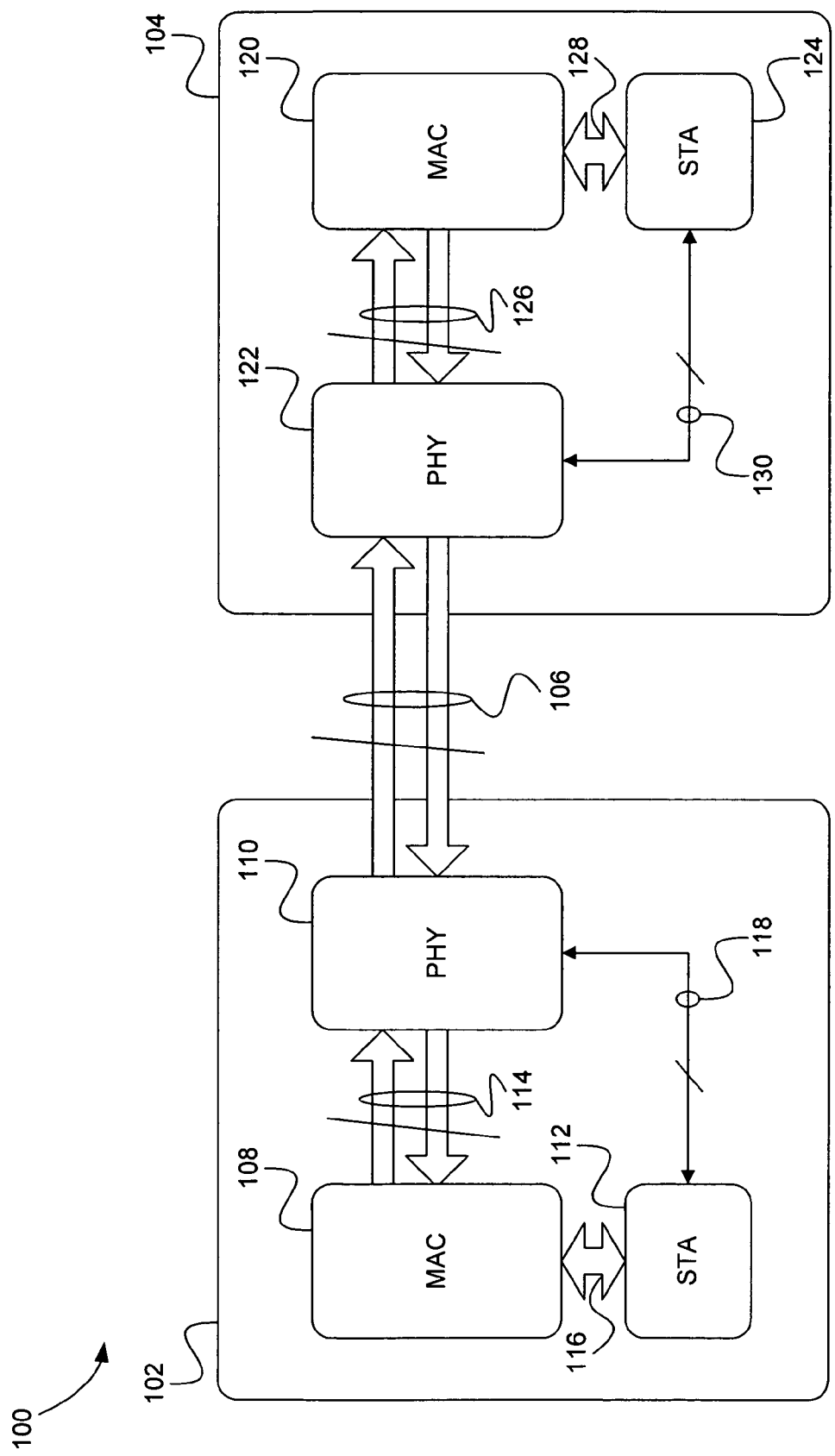
FIG. 1 illustrates a conventional communications network.

FIG. 1 illustrates a conventional communications network 100. The conventional communications network 100 includes a network device 102 and a network device 104. The network device 102 and the network device 104 communicate over a communications link 106.

The conventional communications network 100 operates according to a predefined communications protocol. The predefined communications protocol typically determines the characteristics and operation of the conventional communications network 100. The predefined communications protocol can specify, for example, the format of the data and management information exchanged between the network devices 102 and 104, the structure and speed of the communications link 106, the capabilities and configuration of the network devices 102 and 104, and the types of connectivity interfaces used within the conventional communications network 100.

The predefined communications protocol of the conventional communications network 100 can be, for example, an Institute of Electrical and Electronics Engineers (IEEE) 802.3x Local Area Network (LAN) Ethernet protocol. The IEEE 802.3x Ethernet protocols include multiple standards such as, for example, the 10 Megabit per second (Mbps) standard (IEEE 802.3), the 100 Mbps Fast Ethernet standard (IEEE 802.3u), the 1000 Mbps Gigabit Ethernet standard (IEEE 802.3z/802.3ab) and the 10 Gigabit Ethernet standard (IEEE 802.3ae). Each variant governs operation of the conventional communications network 100. The predefined communications protocol of the conventional communications network 100 is not limited to the protocols listed above.

As shown in FIG. 1, the network device 102 includes a Media Access Controller (MAC) 108, a physical layer device (PHY) 110 and a station manager module 112. The MAC 108, the PHY 110 and the station manager module 112 typically reside on the same integrated circuit (IC) or printed circuit board (PCB). The PHY 110 fosters communication between the MAC 108 and the network device 104. The station manager module 112 manages the operation of the MAC 108 and the PHY 110. Specifically, the station manager module 112 has the ability to read from/write to the management registers of the MAC 108 and the PHY 110. The ability to read from/write to the management registers of the MAC 108 and the PHY 110 allows the station manager module 112 to dynamically adjust the functional operation of the MAC 108 and the PHY 110.

A connectivity interface 114 enables communication between the MAC 108 and the PHY 110. The connectivity interface 114 can be a high-speed parallel interface such as, for example, a Gigabit Media Independent Interface (GMII). The MAC 108 is coupled the station manager module 112 by a connectivity interface 116. The connectivity interface 116 provides the station manager module 112 with access to the management registers of the MAC 108. A connectivity interface 118 enables communication between the station manager module 112 and the PHY 110. The connectivity interface 118 can be, for example, a Management Data Input/Output (MDIO) interface. The connectivity interface 118 provides the station manager module 112 with access to the management registers of the PHY 100.

As further shown in FIG. 1, the network device 104 includes a MAC 120, a PHY 122 and a station manager module 124. The MAC 120, the PHY 122 and the station manager module 124 typically reside on the same IC or PCB. The PHY 122 fosters communication between the MAC 120 and the network device 102. The communications link 106 provides a medium for bi-directional communication between the PHY 122 and the PHY 110. The communications link 106 can be, for example, a Medium Dependent Interface (MDI).

The station manager module 124 manages the operation of the MAC 120 and the PHY 122. Specifically, the station manager module 124 has the ability to read from/write to the management registers of the MAC 120 and the PHY 122. The ability to read from/write to the management registers of the MAC 120 and the PHY 122 allows the station manager module 124 to dynamically adjust the functional operation of the MAC 120 and the PHY 122.

A connectivity interface 126 enables communication between the MAC 120 and the PHY 122. The connectivity interface 126 can be a high-speed parallel interface such as, for example, GMII. The MAC 120 is coupled the station manager module 124 by a connectivity interface 128. The connectivity interface 128 provides the station manager module 124 with access to the management registers of the MAC 120. A connectivity interface 130 enables communication between the station manager module 124 and the PHY 122. The connectivity interface 130 can be, for example, a MDIO interface. The connectivity interface 130 provides the station manager module 124 with access to the management registers of the PHY 122.

The network devices 102 and 104 can typically be configured to support a variety of operational modes (e.g., multiple link/data speeds). Further, the network devices 102 and 104 can be fabricated by a variety of different manufacturers and can be connected by a variety of communication links 106. An Auto-Negotiation routine specified by the predefined communications protocol is typically used to administer the interaction of the network devices 102 and 104 to obviate differences between the network devices 102 and 104. Further, an Auto-Negotiation routine is used to compensate for communication impairments within the environment of the conventional communications network 100.

Overall, Auto-Negotiation is a mechanism by which the PHY 110 and the PHY 122 communicate to determine the mode of operation that will provide an optimal level of performance (e.g., fastest data rate and/or lowest bit error rate). To do so, the Auto-Negotiation protocol determines the various operational modes supported by the network devices 102 and 104. The Auto-Negotiation routine typically advertises and collects information on the abilities of the PHYs 110 and 122 to automatically configure an optimal mode of operation for each device. The PHYs 110 and 122 can employ, for example, an IEEE 802.3x Clause 28 Auto-Negotiation (CL 28 AN) routine.

Auto-Negotiation from the perspective of the network device 102 involves the PHY 110 providing capability information of the network device 102 to the PHY 122. Specifically, management information stored in the management registers of the PHY 110 by the station manager module 112 or the MAC 108 is transmitted to the PHY 122. Auto-Negotiation from the perspective of the network device 102 also involves the station manager module 112 reading management information stored in the management registers of the PHY 110 received from the PHY 122.

Similarly, Auto-Negotiation from the perspective of the network device 104 involves the PHY 122 providing capability information of the network device 104 to the PHY 110. Specifically, management information stored in the management registers of the PHY 122 by the station manager module 124 or the MAC 120 is transmitted to the PHY 110. Auto-Negotiation from the perspective of the network device 104 also involves the station manager module 124 reading management information stored in the management registers of the PHY 122 received from the PHY 110.

The management information exchanged between the PHYs 110 and 122, and subsequently read by the station manager modules 112 and 124, is used to set an operating mode for the PHYs 110 and 122. The conventional communications network 100 accommodates the use of an Auto-Negotiation routine by providing a high level of connectivity between the station manager module 112, the PHY 110, the PHY 122 and the station manager module 124.

Figure 2:
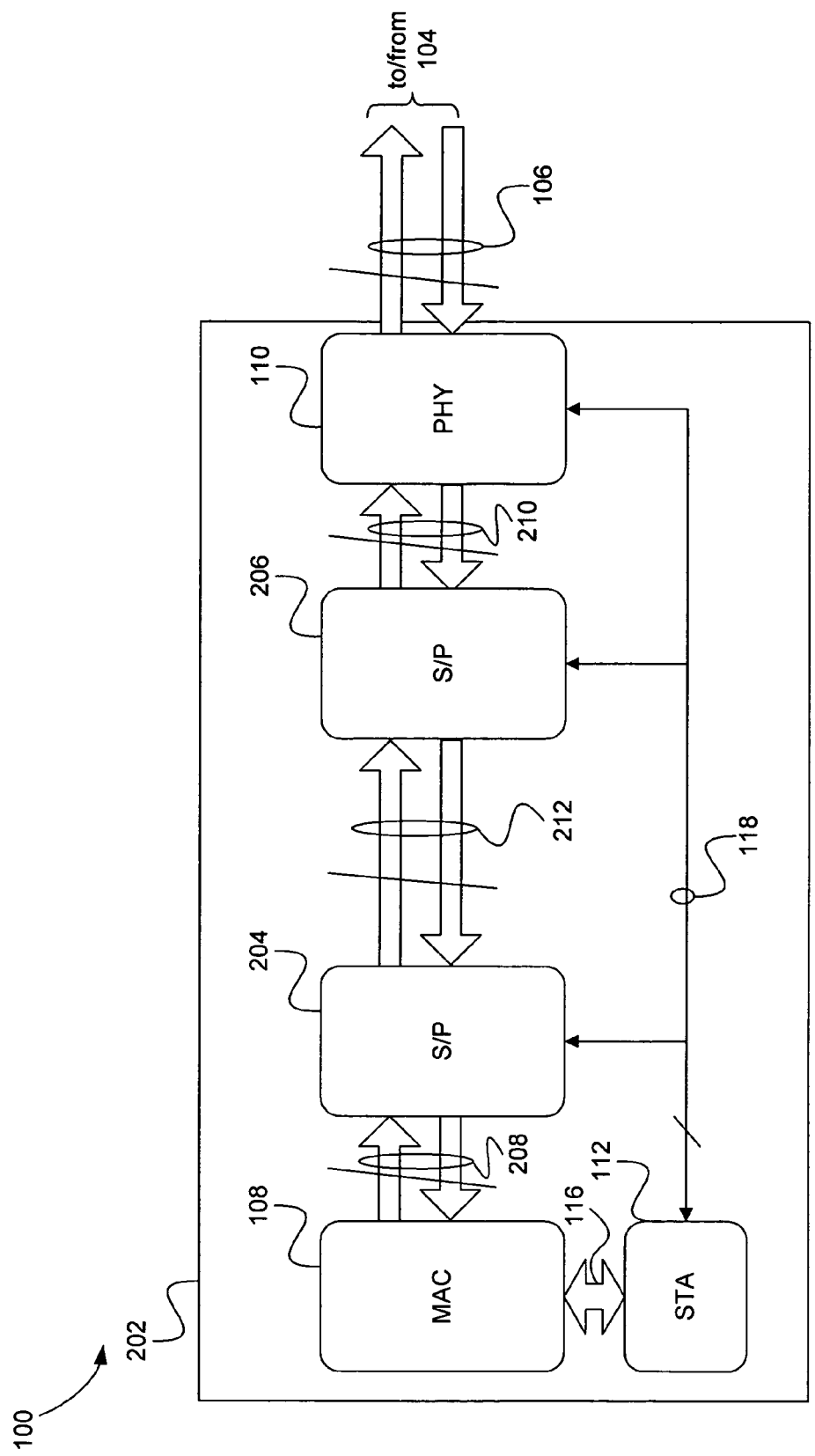
FIG. 2 illustrates a conventional network device having an additional communications interface as an alternative to a network device depicted in FIG. 1.

FIG. 2 illustrates a conventional network device 202 having an additional communications interface. The conventional network device 202 is an alternative configuration of the network device 102 depicted in FIG. 1.

The conventional network device 202 includes a communications interface device 204 and a communications interface device 206. The communications interface devices 204 and 206 foster communication between the MAC 104 and the PHY 110. A connectivity interface 212 enables communication between the communications interface devices 204 and 206. A connectivity interface 208 enables communication between the MAC 104 and the communications interface device 204. Similarly, a connectivity interface 210 enables communication between the communications interface device 206 and the PHY 110. The communications interface devices 204 and 206, in conjunction with the connectivity interface 212, form the additional communications interface of the conventional network device 202.

The communications interface devices 204 and 206 can be, for example, serial-to-parallel (S/P) converters. Further, the connectivity interface 212 can be a high-speed serial interface such as, for example, a Serial Gigabit Media Independent Interface (SGMII). The connectivity interfaces 208 and 210 can therefore be high-speed parallel interfaces such as, for example, SGMII. In the following description, the communications interface devices 204 and 206 will be referred to as S/P converters 204 and 206 but are not limited to S/P converters. Further, in the following description, the communications interface devices 204 and 206, in conjunction with the connectivity interface 212, will be referred to as forming an S/P interface of the conventional network device 202, but is not so limited.

The S/P converters 204 and 206 typically employ an Auto-Negotiation routine to exchange abilities and to automatically determine a mode of operation. The Auto-Negotiation routine can be used to adjust modes of operation to maintain or improve performance. The S/P converters 204 and 206 can employ, for example, an IEEE 802.3x Clause 37 Auto-Negotiation (CL 37 AN) routine.

The connectivity interfaces 208 and 210 typically only provide for the exchange of data and do not provide for the exchange of management information. Therefore, a high level of management connectivity is required to ensure effective management of the constituent elements of the conventional network device 202. That is, the station manager module 112 must maintain management connections to the MAC 108, the S/P converters 204 and 206 and the PHY 110 to provide efficient management. The constituent elements of the conventional network device 202 are typically fabricated on the same Printed Circuit Board (PCB) or Integrated Circuit (IC), thereby making a high level of management connectivity possible at a low cost.

The connectivity interface 118 provides this high level of connectivity between the station manager module 112 and the constituent elements of the conventional network device 202. Specifically, the station manager module 112 maintains connectivity to the S/P converter 204, the S/P converter 206 and the PHY 110 through the connectivity interface 118. The connectivity interface 118 provides the station manager module 112 with access to the management registers of the S/P converters 204 and 206 and the PHY 110. As a result, the station manager module 112 can configure or set the abilities of the S/P converters 204 and 206 and the PHY 110, in accordance with respective Auto-Negotiation routines. Further, the station manager module 112 can access management information provided to the PHY 110 from the network device 104. The station manager module 112 can also transmit management information to the network device 104 through the PHY 110. Overall, the structure and arrangement of the conventional network device 202 provides the station manager module 112 with the ability to effectively manage the S/P converters 204 and 206, the connectivity interface 212, the PHY 110 and the communications link 106.

Figure 3:
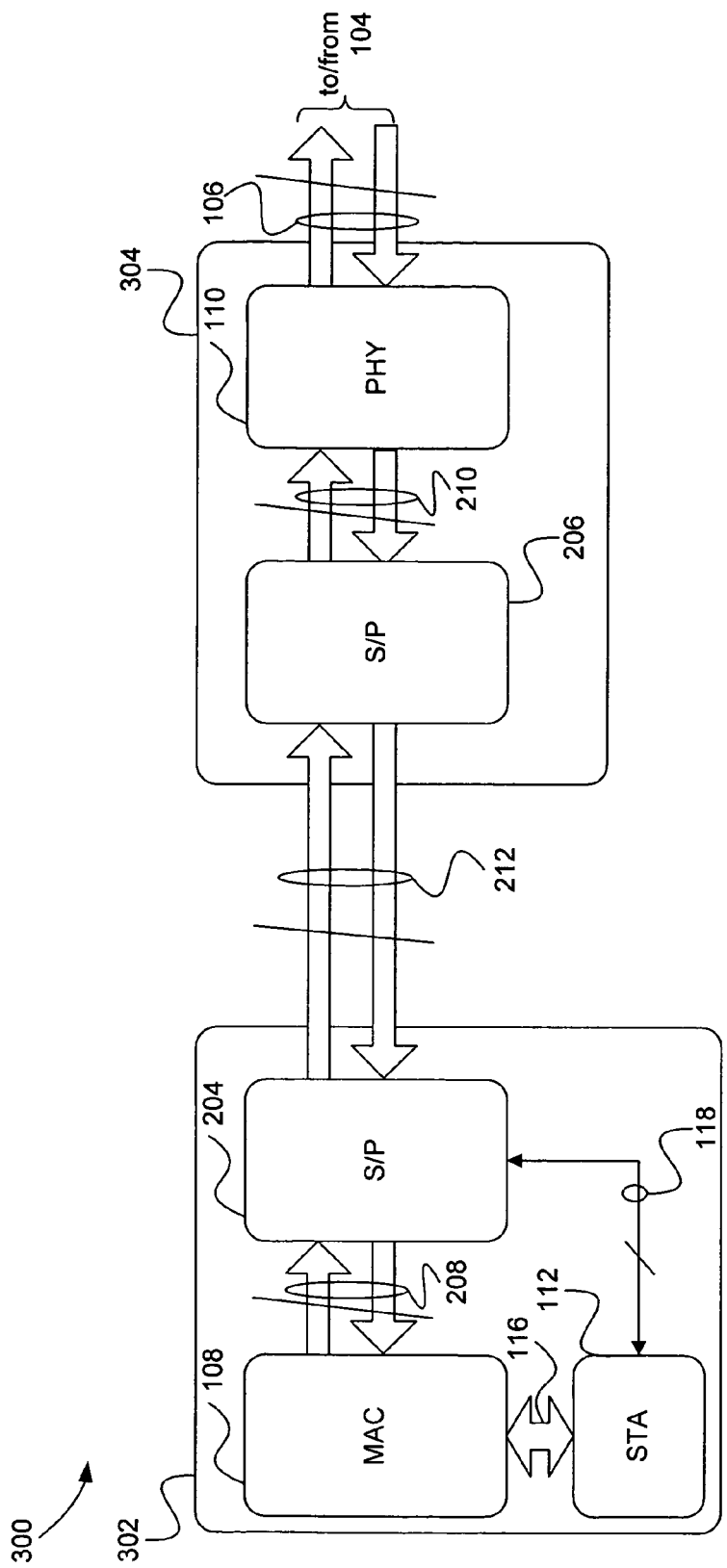
FIG. 3 illustrates a conventional communications network as an alternative to the conventional communications network depicted in FIGS. 1 and 2.

FIG. 3 illustrates a conventional communications network 300. The conventional communications network 300 is an alternative configuration of the conventional communications network 100 depicted in FIGS. 1 and 2. The conventional communications network 300 operates according to a similar set of predefined communications protocols governing operation of the communications network 100. The conventional communications network 300 includes a local network management device 302, a remote network device 304 (i.e., a local link partner) and the network device 104 (i.e., a remote link partner 104). The local network management device 302 and the remote network device 304 are connected by an S/P interface 212.

Together, the constituent elements of the local network management device 302 and the constituent elements of the remote network device 304 comprise the conventional network device 202. However, the constituent elements of the local network management device 302 and the remote network device 304 reside on different PCBs or ICs. The benefits of this "parcelization" of the constituent elements of the conventional network device 202 are discussed below.

Figure 4:
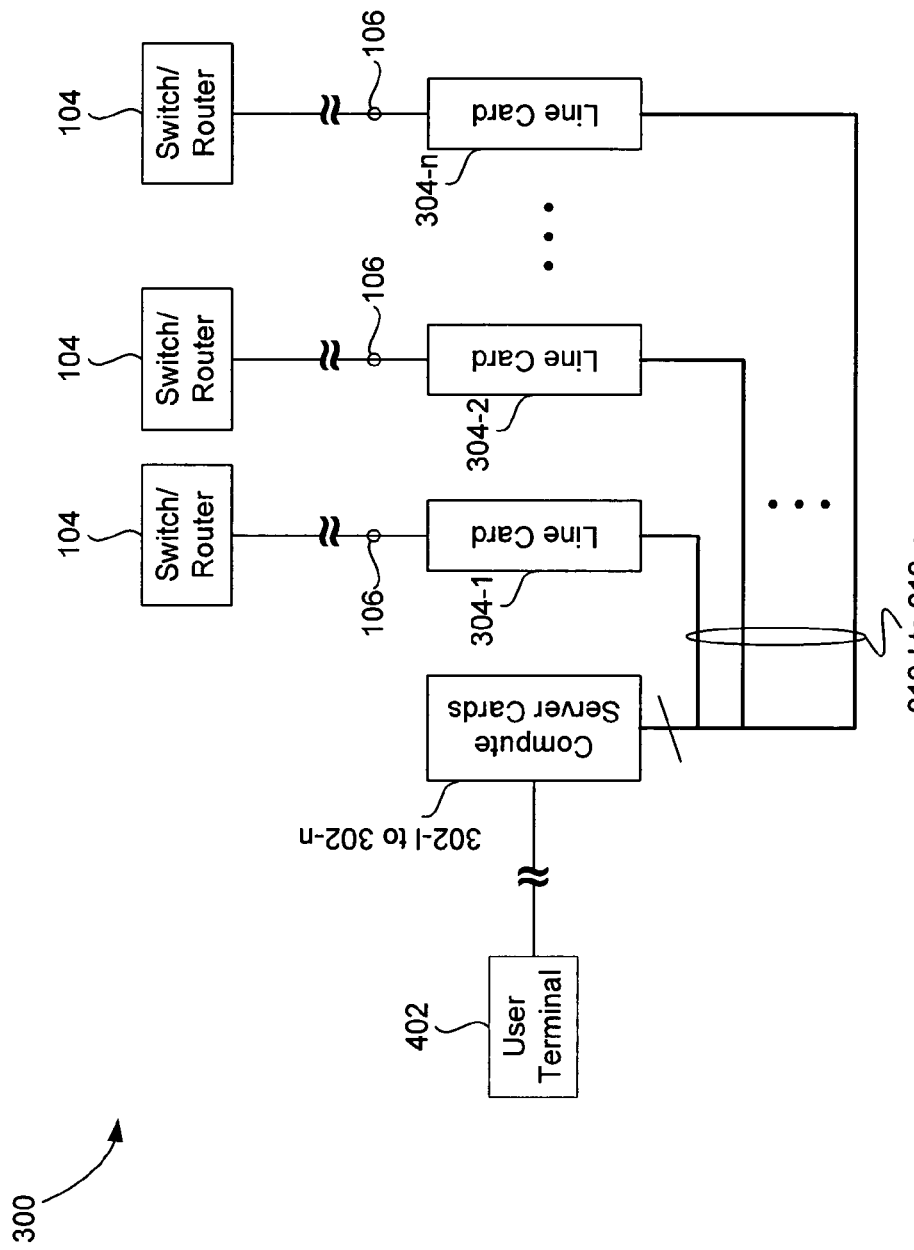
FIG. 4 illustrates a topological view of the conventional communications network depicted in FIG. 3.

The S/P interface connecting the local network management device 302 and the remote network device 304 enables increased spatial separation between the MAC 108 and the PHY 110 and promotes connectivity to multiple remote PHYs. FIG. 4 illustrates a topological view of the conventional communications network 300. As shown in FIG. 4, a number of local network management devices 302-1 to 302-n are connected to corresponding remote network devices 304-1 to 304-n over corresponding connectivity interfaces 212-1 to 212-n. Specifically, each local network management device 302 is connected to one remote network device 304 via a point-to-point link (i.e., a connectivity interface 212).

The network management devices 302 can be connected to a user terminal 402. A user can access/manage the conventional communications network 300 using the user terminal 402. The local network management devices 302 can be a compute server cards while the link partners 304 can be line cards connected to the compute server cards over a common backplane. The remote network devices 304 can each be connected to a remote link partner 104. The remote link partners 104 can be remote switches or routers designed to handle high-speed, high-volume traffic. In this way, the conventional communications network 300 pushes complex switching/routing operations out to remote dedicated devices (i.e., the remote link partners 104) while aggregating connectivity and management to a central location (i.e., a backplane housing the local network management devices 302 and multiple remote network devices 304).

Returning to FIG. 3, however, reveals limitations in the management capabilities of the local network management device 302. Specifically, the connectivity interface 118 no longer provides a connection between the local station manager module 112 and the PHY 110. A connection is needed for effective management since management information is not exchanged between the S/P converter 206 and the PHY 110. As a result, there is no mechanism available to provide the exchange of management information between the local station manager module 112 and the PHY 110.

The PHY 110 is considered a remote PHY due to this lack of connectivity as well as due to its location on a separate PCB or IC. This lack of connectivity prevents the local station manager module 112 from effectively setting the abilities of the PHY 110 to ensure optimal communication performance, in accordance with the Auto-Negotiation routine of the remote PHY 110. Overall, optimizing the operation of the PHY 110 by the station manager module 112 is not possible in the conventional communications network 300. Therefore, what is needed is a communications network that provides for remote PHY Auto-Negotiation. Specifically, a communications is needed that fosters the exchange of management information between a local station manager module and a remote PHY to ensure optimal performance of the remote PHY and its connection to a remote link partner.

FIG. 5 illustrates a communications network 500 that provides remote PHY Auto-Negotiation. Specifically, the communications network 500 provides the exchange of management information between a local station manager module and a remote PHY over a communications interface to promote optimal operation of the remote PHY.

As shown in FIG. 5, the communications network 500 includes a local network management device 502 and a remote network device 504. The remote network device 504 includes the remote PHY 110 and is connected to a remote link partner 104. The remote network device 504 and the local network management device 502 can be connected by, for example, a backplane or a cable. The remote link partner 104 can be a remote switch or router. Alternatively, the remote link partner 104 and remote network device 504 can be similarly structured. The remote link partner 104 can be located at a great distance from the remote network device 504 or, alternatively, can be located on the same backplane housing the remote network device 504. The communications network 500 operates according to a predefined communications protocol: for example, one or more of the IEEE 802.3x LAN Ethernet protocols.

The remote network device 504 includes an independent station manager module 506. The independent station manager module 506 is a logic device having the ability to read from/write to the management registers of the remote PHY 110 and the S/P converter 206. The ability to access the management registers of the PHY 110 and the S/P converter 206 allows the independent station manager module 506 to transfer management information between the PHY 110 and the S/P converter 206.

Management information transferred from the PHY 110 to the S/P converter 206 can be further transferred to the local network management device 502. Similarly, management information transferred from the S/P converter 206 to the PHY 110 can be further transferred to the remote link partner 104. In this way, a management communication interface is established between the local network management device 502 and the PHY 110. This management communication interface enables the local network management device 502 to dynamically monitor and adjust the operation of the PHY 110, thereby promoting remote PHY 110 Auto-Negotiation.

During operation of the communications network 500, the independent station manager module 506 uses an interface 512 to read management information stored in the management registers of the PHY 110. The independent station manager module 506 uses an interface 510 to transfer the management information to the management registers of the S/P converter 206. The management information stored in the management registers of the PHY 110 can be management information received from the remote link partner 104 or can be management information automatically generated by the PHY 110. Management information received from the remote link partner 104 is typically information exchanged during Auto-Negotiation with the PHY 110 and can include, for example, the operational mode/speed of the remote link partner 104. Management information automatically generated by the PHY 110 can include, for example, traffic monitoring statistics or pre-emphasis values.

Management information transferred to the S/P converter 206 by the independent station manager module 506 can be further transferred to a station manager module 508. To do so, the management information is first transmitted from the S/P converter 206 to the S/P converter 204. Specifically, the management information is transmitted and stored in the management registers of the S/P converter 204. To transfer the management information over the connectivity interface 212, the independent station manager module 506 reformats the management information in accordance with the communications protocol of the communications network 500 to generate a management message. Specifically, the independent station manager module 506 reformats the management information according to a message template of the Auto-Negotiation (AN) routine of the S/P interface. The management message is then transmitted by the S/P converter 212.

The S/P converter 204 receives the management message and stores the management message in one or more management registers. The station manager module 508, having access to the management registers of the S/P converter 204, subsequently reads the stored management information. Specifically, the station manager module 508 unpacks the management information contained within the management message. The station manager module 508 can adjust the operation of the MAC 108 or the S/P converter 204 based on the received management information. Alternatively, the station manager module 508 can transmit management information (i.e., a management command) to the remote network device 104 to adjust operation of the S/P converter 206 or the PHY 110 based on the received management information.

To transmit information to the remote network device 104, the station manager module 508 also formats generated management information according to a message template specified by the communications protocol to produce a management message. The management message is then transmitted by the S/P converter 204 to the S/P converter 206.

The S/P converter 206 receives the management message and stores the management message in one or more management registers. The independent station manager module 506 subsequently uses the interface 510 to read the contents of the management registers of the S/P converter 206 to unpack the management information. The independent station manager module 506 then uses the interface 512 to write the management information to the management registers of the PHY 110. The management information can be further transferred to the remote link partner 104 or, alternatively, can include a management command that adjusts operation of the PHY 110. Management information intended for the remote link partner 104 can be transferred by the PHY 110 using the Auto-Negotiation routine employed by the PHY 110 and the remote link partner 104.

The Auto-Negotiation routine employed by the PHY 110 and the remote link partner 104 provides for the exchange of management information in the form of Pages. "Base Pages" contain basic management information while "Next Pages" contain additional, higher level management information.

These Base Pages and Next Pages are transferred during an auto-negotiation period of the PHY 110 and the remote link partner 104.

Similarly, the Auto-Negotiation routine employed by the S/P converters 204 and 206 also includes the communication of Base Pages and Next Pages during an auto-negotiation period. The independent station manager module 506 operates to convert management information contained in the Next Pages and Base Pages received by the PHY 110 from the link partner 104 into a Next Page format exchanged by the S/P converters 204 and 206. This enables management information received by the PHY 110 to be passed to the station manger module 508. Further, the independent station manager module 506 operates to convert management information contained in the Next Pages and Base Pages received by the S/P converter 206 from the S/P converter 204 into a Next Page format exchanged by the PHY 110 and the remote link partner 104. This enables management information generated by the station manager module 508 to be passed to the PHY 110 or the remote link partner 104.

The independent station manger module 506 uses a Next Page reserved by the Auto-Negotiation routine of the S/P interface for customization to initiate the transfer of management information from the S/P converter 206 to the S/P converter 204. Specifically, the independent station manger module 506 generates a communication initiation Next Page from a message template reserved by the communications protocol. This communication initiation Next Page opens a management communication channel between the S/P converters 204 and 206. This management channel is embedded within the normal management messages exchanged between the S/P converters 204 and 206.

After the exchange of the communication initiation Next Page, the S/P converter 206 sends Next Pages to the S/P converter 204 under the direction of the independent station manger module 506. These subsequent Next Pages can be formatted in accordance with the Next Page template of the Auto-Negotiation routine of the S/P converters 204 and 206. However, the subsequent Next Pages are user-defined in that they contain data in accordance with the management information sharing mechanism of the present invention.

The communication initiation Next Page is used to identify the remote network device 504 as being capable of sending and receiving user-defined Next Pages. Further, the communication initiation Next Page is used to identify the number of user-defined Next Pages following the communication initiation Next Page. Multiple user-defined Next Pages may be needed to convey a large amount of management information or to translate Next Pages from one Auto-Negotiation routine to another. The user-defined Next Pages are exchanged at the same time as other management information exchanged from the S/P converter 206 to the S/P converter 204, thereby forming the embedded management channel. The user-defined Next Pages are stored by the S/P converter 204 and subsequently read by the station manager module 508. The station manager module 508 assembles the management information contained within the user-defined Next Pages to form a complete management message or command.

User-defined Next Pages from the S/P converter 204 to S/P converter 206 are exchanged in a similar manner. Specifically, the station manager module 508 uses a Next Page reserved by the Auto-Negotiation routine of the S/P interface for customization to initiate the transfer of management information from the S/P converter 204 to the S/P converter 206. Subsequent user-defined Next Pages are transmitted by the S/P converter 204 and are stored in the management registers of the S/P converter 206. The independent station manager module 506 reads the user-defined Next Pages and assembles the management information in proper order. The management information contained within the user-defined Next Page is then written to the management registers of the PHY 110.

Management information received from the S/P converter 204 can be intended for the remote link partner 104. If so, then the PHY 110 transfers the management information to the remote link partner 104 according to the Auto-Negotiation routine employed by the PHY 110 and the remote link partner 104. Alternatively, the management information can be a management message or command intended for the PHY 110. If so, the PHY 110 executes the management command or processes the management message. For example, an executed management command can change the operational settings or mode (i.e., the speed) of the PHY 110. In this way, the station manager module 508 can manage and set the abilities of the PHY 110 in response to Auto-Negotiation information exchanged by the PHY 110 and the link partner 104.

The independent station manager module 506 includes logic to enable the transfer of register contents between the PHY 110 and the S/P converter 206 and to coherently assemble management information contained or spread out over several user-defined Next Pages. The independent station manager module 506 can be configured as a Field Programmable Gate Array (FPGA) or a Programmable Logic Device (PLD). Alternatively, the independent station manager module 506 can be configured as a microprocessor having associated memory. Further, the independent station manager module 506 can be configured as any logic device or module (e.g., an Application Specific Integrated Circuit—ASIC) specifically designed to transfer register contents between the PHY 110 and the S/P converter 206 and to coherently assemble partitioned management information.

The interfaces 510 and 512 provide access to the management registers of the S/P converter 206 and the PHY 110, respectively. The interfaces 510 and 512 can be configured as a combined single physical interface having an associated network or management address. Alternatively, the interfaces 510 and 512 can be configured as separate interfaces with each interface having a unique network or management address. Under either scenario, these interfaces can be configured, for example, as a Management Data Clock/Management Data Input/Output (MDC/MDIO) interface specified by IEEE 802.3 CL 22 or CL 45 or an Intelligent Interface Controller (I2C). Further, the interfaces 510 and 512 can be configured as a parallel register interface or a direct register interface enabling the direct sharing of register bits. The interfaces 510 and 512 can also be configured, either separately or combined, as a direct set of status and control bits.

Figure 6:
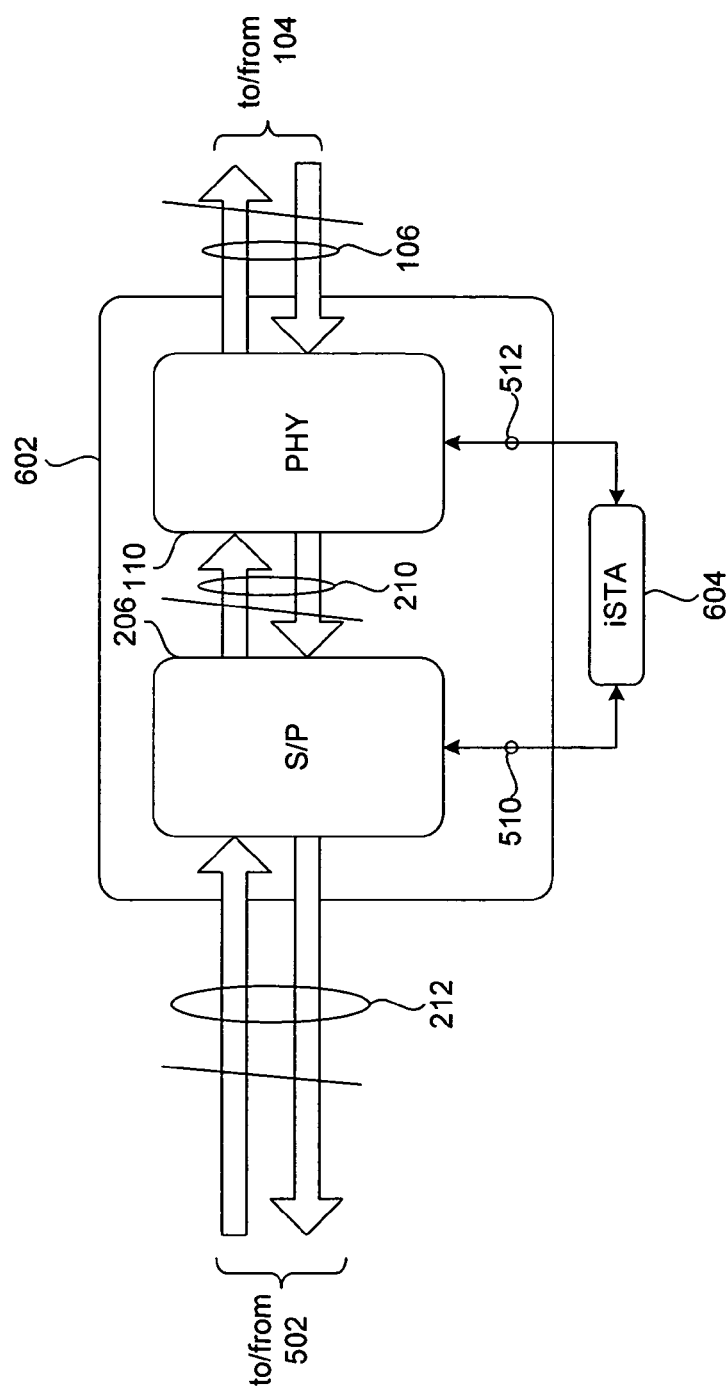
FIG. 6 illustrates a remote network device of the present invention having an external independent station manager module.

As shown in FIG. 5, the independent station manager module 506 is an internal component of the link partner 504. The independent station manager module 506, however, is not limited to this configuration and can be a separate external component having access to a network device. FIG. 6 illustrates a remote network device 602 having an external independent station manager module 604. The independent station manager module 604 operates in a manner similar to the independent station manager module 506 depicted in FIG. 5, but is external to the remote network device 602

Figure 7:
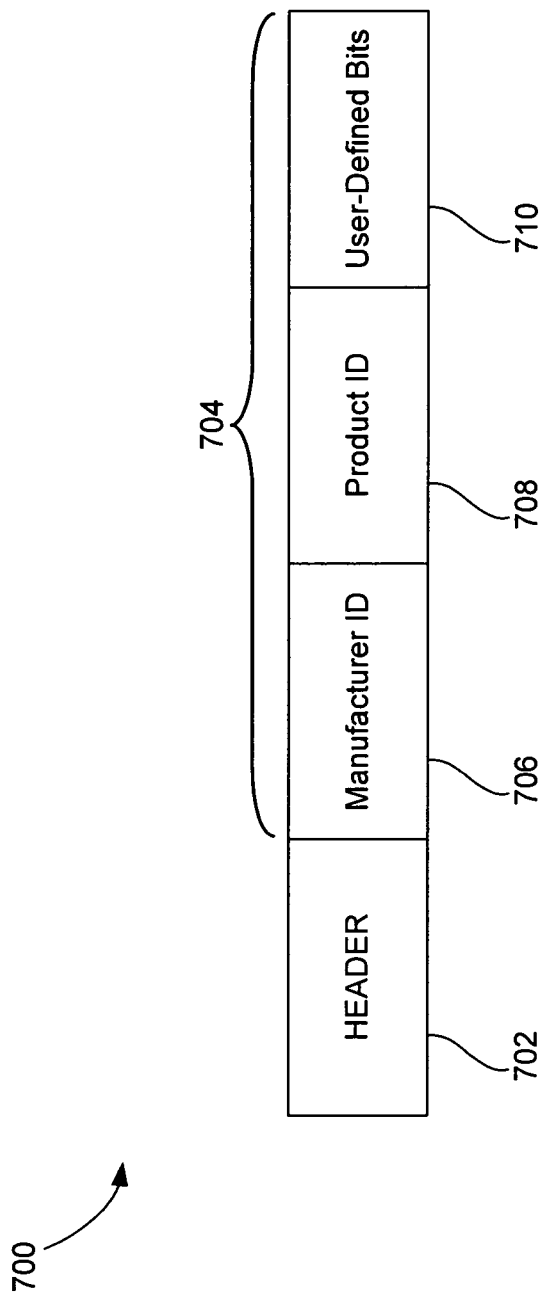
FIG. 7 illustrates a communication initiation Next Page of the present invention.

FIG. 7 illustrates a communication initiation Next Page 700. The communication initiation Next Page 700 is a data packet that includes a header 702 and a body 704. The communication initiation Next Page 700 is transmitted by the S/P converter 204 for transmission to the S/P converter 206 under the direction of the station manager module 508. Alternatively, the communication initiation Next Page 700 is transmitted by the S/P converter 206 to the S/P converter 204 under the direction of the independent station manager module 506. Under either scenario, the communication initiation Next Page 700 is used to initiate the exchange of management information between the PHY 110 and the station manger module 508. Specifically, the communication initiation Next Page 700 indicates that additional Next Pages will follow (e.g., by opening an embedded management channel). Further, the communication initiation Next Page 700 can indicate the number of subsequent Next Pages and can indicate the type of information that will be contained in the subsequent Next Pages.

The header 702 is used to identify or flag the data packet as the communication initiation Next Page 700. The body 704 includes a data field 706, a data field 708 and a data field 710. The data field 710 is reserved by the Auto-Negotiation routine of the S/P interface for customization. That is, the data field 710 can be packed with management information to initiate a management connection interface in accordance with the present invention.

In one aspect of the present invention, the communication initiation Next Page 700 is the Message Page 6 Next Page specified by the Annex 28C AN of the IEEE 802.3 LAN Ethernet protocols. The Message Page 6 Next Page is a PHY identifier tag code Next Page and is used to exchange identification information between network devices. The Message Page 6 Next Page includes one message page and four unformatted pages. The message page is located in the header 702 and identifies the Next Page as the Message Page 6 Next Page. The message page is eleven bits long and has the form "000 0000 0110." Alternatively, the communication initiation Next Page 700 is the Message Page 5 Next Page specified by the Annex 28C AN.

The four unformatted message pages are located in the body 704 and can provide up to forty-four bits of data. Thirty-two of the bits are used to identify the device transmitting the Message Page 5/6 Next Page. Specifically, sixteen bits are located in the data field 706 and identify the manufacturer of the device (i.e., the IEEE MDIO Register 2 contents). The remaining sixteen bits are located in the data field 708 and identify the model of the device (i.e., the IEEE MDIO Register 3 contents). The last twelve bits of the four unformatted message pages are located in the data field 710 and can be user-defined. These bits can be coded in accordance with the present invention to specify the number and type of user-defined Next Pages that follow the communication initiation Next Page 700.

Figure 8:
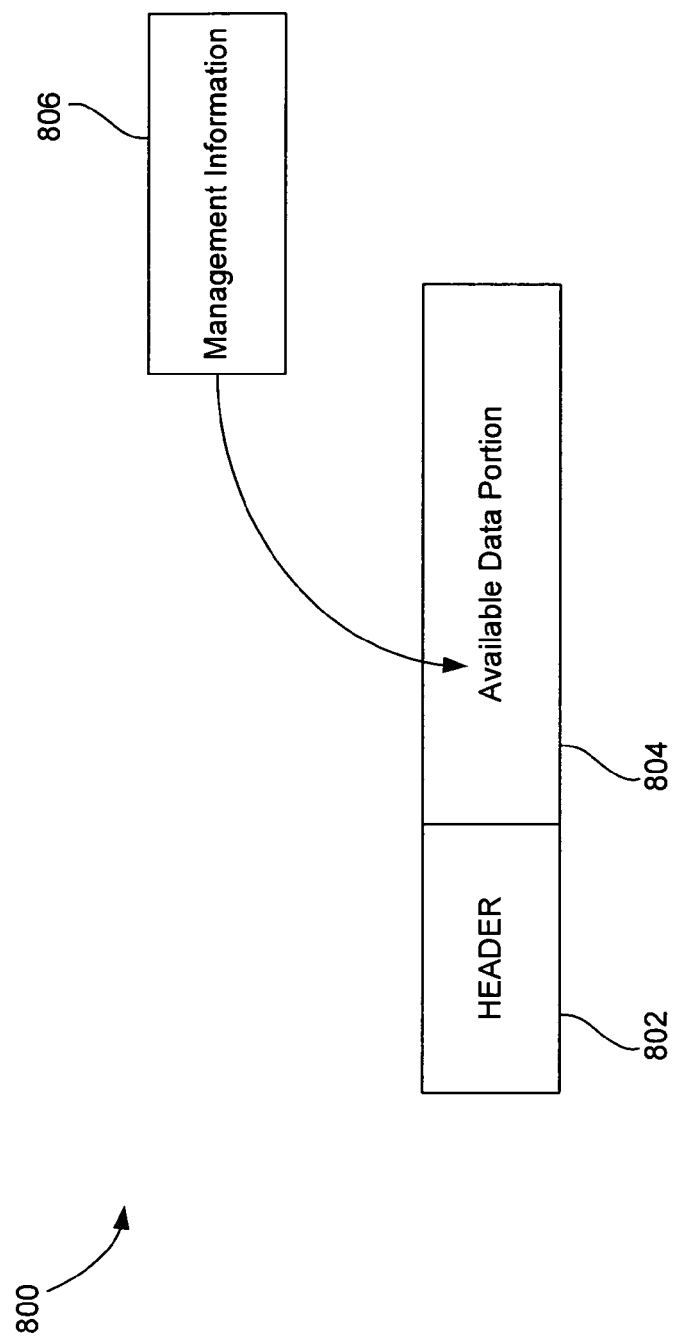
FIG. 8 illustrates a user-defined Next Page of the present invention.

FIG. 8 illustrates a user-defined Next Page 800. The user-defined Next Page 800 is a data packet that includes a header 802 and a body 804. The user-defined Next Page 800 is transmitted by the S/P converter 204 for transmission to the S/P converter 206 under the direction of the station manager module 508. Alternatively, the user-defined Next Page 800 is transmitted by the S/P converter 206 for transmission to the S/P converter 204 under direction of the independent station manager module 506. Under either scenario, the user-defined Next Page 800 is used to exchange management information between the PHY 110 and the station manger module 508.

The header 802 identifies the data packet as a user-defined Next Page 800. The user-defined Next Page 800 is formatted in accordance with Next Pages specified by an Auto-Negotiation routine of the communications protocol governing operation of the communications network 500. In this way, transmission and reception of the user-defined Next Page 800 is accommodated and fully supported by the predefined communications protocol.

The user-defined Next Page 800 follows the communication initiation Next Page 700 and transports management information 806 in the body 804. Under a first scenario, the management information 806 is supplied by the PHY 110 and is placed into the body 804 for transport to the S/P converter 204. The management information 806 from the PHY 110 can be automatically generated management information or can be management information received from the remote link partner 104. For example, the management information 806 can be a complete (i.e., header and body) Next Page or Base Page data packet from the PHY 110 Auto-Negotiation routine. Alternatively, the management information 806 can be a portion (i.e., body only or portion of a body only) of a Next Page or Base Page data packet from the PHY 110 Auto-Negotiation routine.

The S/P converter 204 stores the received user-defined Next Page 800 in one or more management registers. The station manager module 508 reads the stored user-defined Next Page 800 and processes the management information 806 stored in the body 804. To process the management information 806, the station manager module 508 first coordinates the assembly of management information 806 received from multiple user-defined Next Pages 800.

Under a second scenario, the management information 806 is supplied by the station manager module 508 and is placed into the body 804 for transport to the S/P converter 206. The management information 806 from the station manager module 508 can include, for example, communication properties of the S/P converter 204 (i.e., pre-emphasis values, speeds, etc.). The S/P converter 206 stores the received user-defined Next Page 800 in one or more management registers. The independent station manager module 506 reads the stored user-defined Next Page 800 and processes the management information 806 stored in the body 804. To process the management information 806, the independent station manager module 506 first coordinates the assembly of management information 806 received from multiple user-defined Next Pages 800.

Management information intended for the S/P converters 204 and 206 is exchanged over the connectivity interface 212 during the AN process of the S/P converters 204 and 206. The communication initiation Next Page 700 and the user-defined Next Pages 800 are transmitted with these management communication messages. The communication initiation Next Page 700 and the user-defined Next Pages 800 can therefore represent a portion of the management messages exchanged during the auto-negotiation hand shaking conducted by the S/P converters 204 and 206. In this way, an indirect or embedded management channel carrying management information between local network management device 502 and the remote PHY 110 is formed. This indirect management channel is created within the existing management channel specified by the protocol governing operation of the connectivity interface 212.

Figure 9:
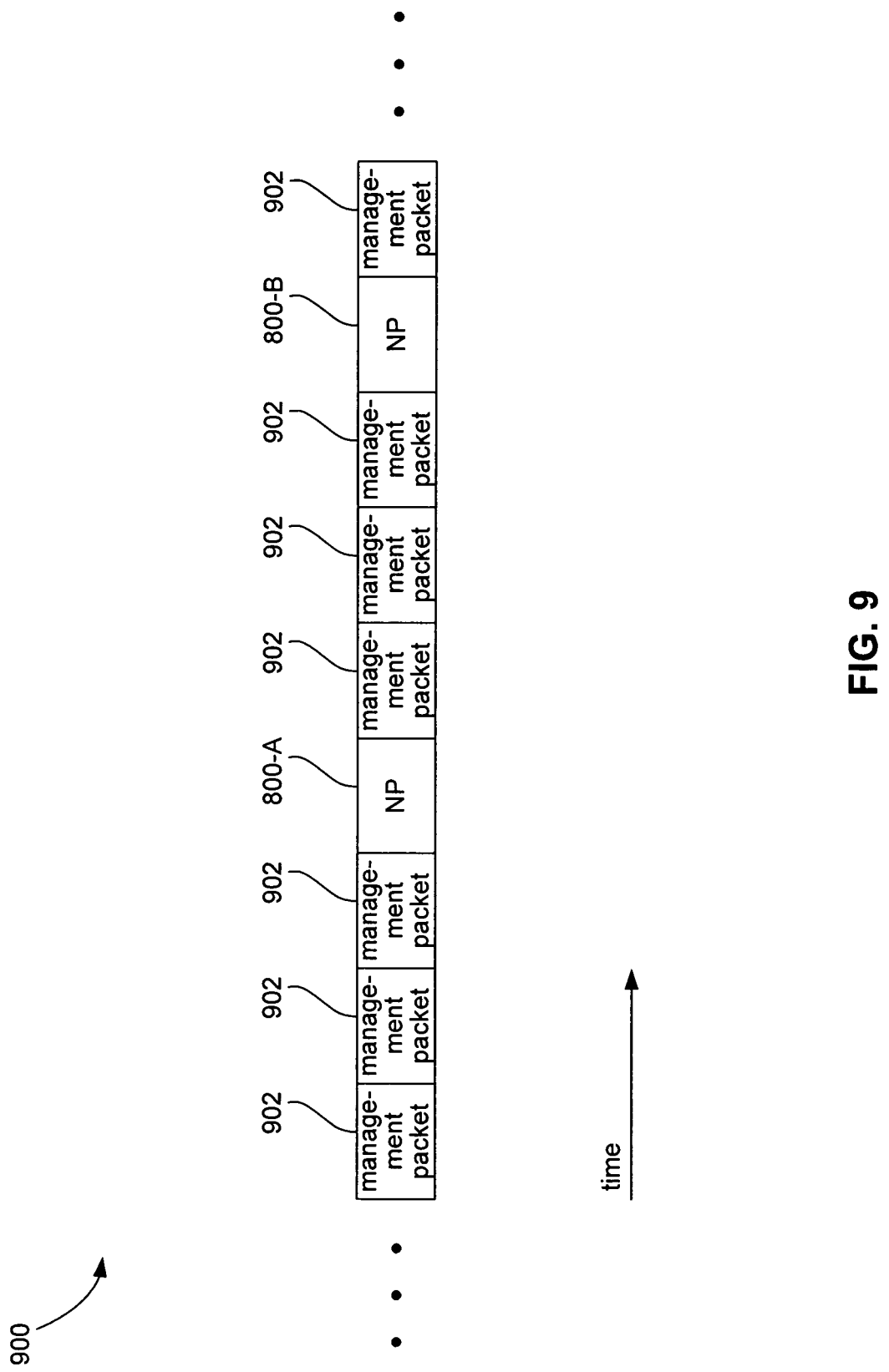
FIG. 9 illustrates the formation of an embedded management channel within a traffic channel established between a communications interface of the present invention.

FIG. 9 illustrates the formation of an embedded management channel within a management channel 900 established between a communications interface of the present invention. The management channel 900 illustrates the flow of management information exchanged between the S/P converters 204 and 206 during an auto-negotiation period of the S/P converters 204 and 206. As shown in FIG. 9, sequentially transmitted management information packets form the management channel 900. The management channel 900 includes management packets 902 and user-defined Next Pages 800 (depicted as intermittent Next Pages 800-A and 800-B). The management packets 902 contain management data exchanged by the S/P converters 204 and 206 and intended for the S/P converters 204 and 206. The user-defined Next Pages 800 contain management data for either the local network management device 502 or the remote PHY 110 and are also exchanged by the S/P converters 204 and 206.

Over a given period of time, the management channel 900 can include only management packets 902, only user-defined Next Pages 800 or both management packets 902 and user-defined Next Pages 800. The formation of an embedded management channel obviates the need to stop the transfer of management data intended for the S/P converters 204 and 206 to accommodate management information transfer between the local network management device 502 and the remote PHY 110. Further, as previously discussed, the embedded management channel can be fully supported by the existing Auto-Negotiation routine employed by the connectivity interface 212.

Figure 10:
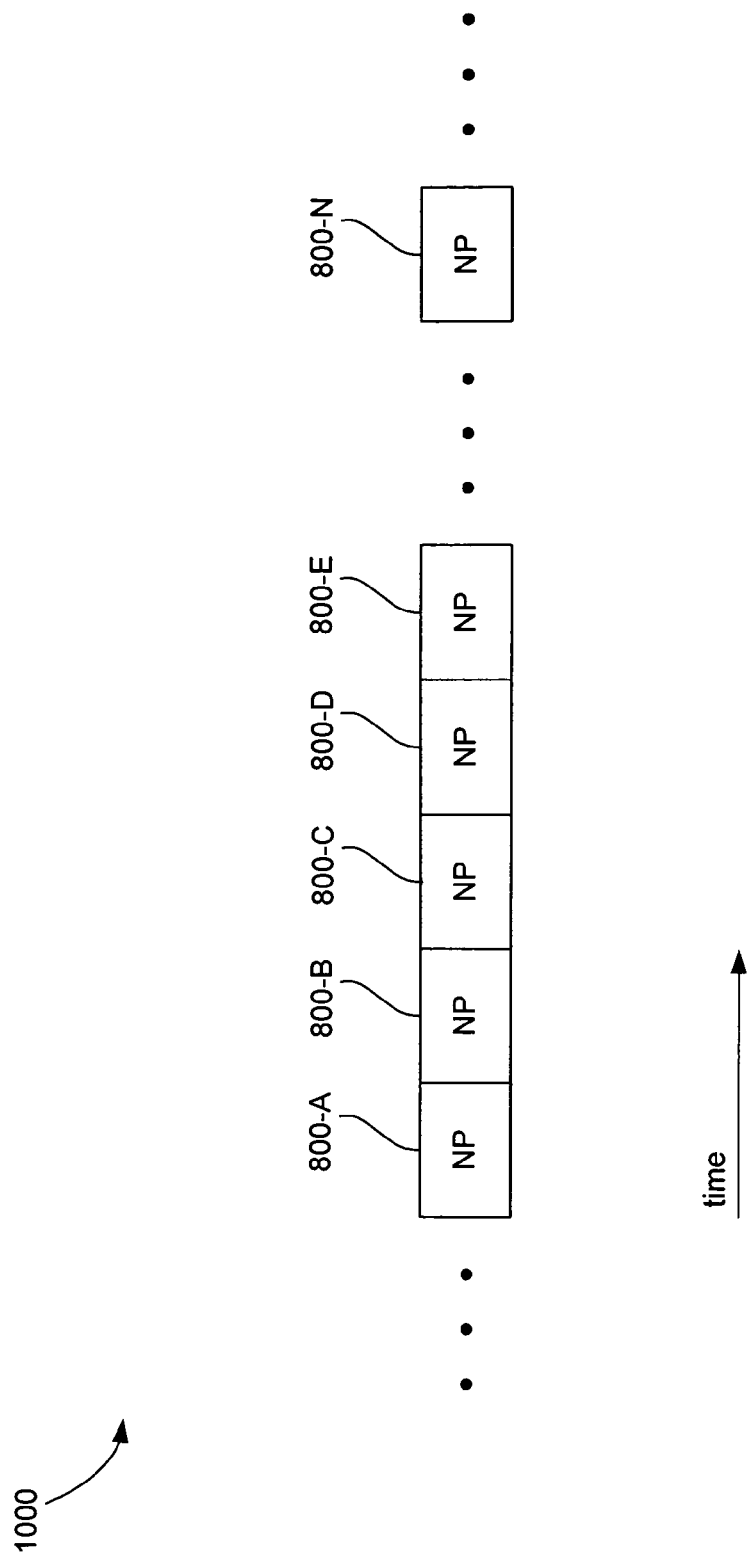
FIG. 10 illustrates the contents of an embedded management channel generated in accordance with the present invention FIG. 11 provides a flowchart that illustrates operational steps corresponding to FIG. 5 (or FIG. 6) for using the management interface of the present invention to deliver management information from a local network management device to a remote PHY.

FIG. 10 illustrates the contents of an embedded management channel 1000 generated in accordance with the present invention. The embedded management channel 1000 includes the user-defined Next Pages 800 (depicted as Next Pages 800-A through 800-N) transmitted over the traffic channel 900 depicted in FIG. 9. Alternatively, the embedded management channel 1000 can be viewed as comprising the payload of the user-defined Next Pages 800.

In one aspect of the present invention, the user-defined Next Pages 800 are sixteen bits long. Five of the sixteen bits are used as a header to identify the user-defined next-page while the remaining eleven bits contain management information. If the management information to be exchanged over the S/P interface is longer than sixteen bits, then the management information can be partitioned into one or more portions and transported within the data field of one or more user-defined Next Pages 800. The partitioned management information can be subsequently re-assembled by the independent station manger module 506 or the station manager module 508 to coherently re-create the originally transmitted management message or command. Further, a communication initiation Next Page can establish the embedded management channel 1000 such that any number of user-defined Next Pages 800 can follow the communication initiation Next Page.

In another aspect of the present invention, the communication initiation Next Page 700 is used to transfer management information between the S/P converters 204 and 206. That is, the data field 710 of the communication initiation Next Page 700 is used to exchange management information over the communications link 106. Multiple communication initiation Next Pages 700 can be transmitted to establish an embedded management channel 1000. In this way, the embedded management channel 1000 for remote PHY Auto-Negotiation can be provided by "user-defined" Next Pages 700.

The management information sharing mechanism provided by the present invention enables a local station manager module within a local network management device to remotely and dynamically adjust the operation of a remote PHY located in a remote network device without the need for a direct wired connection. The management interface of the present invention accommodates remote PHY Auto-Negotiation such that the mode of operation of the remote PHY can be determined and set by a local network management device. Further, the management interface of the present invention fosters the exchange of management information between a remote link partner and local network management device. In this way, a local or remote user terminal coupled to the local network device can manage the remote PHY. Specifically, the user terminal can be used to generate and issue management commands to the remote PHY through a seemingly direct management channel having direct management access.

Figure 11:
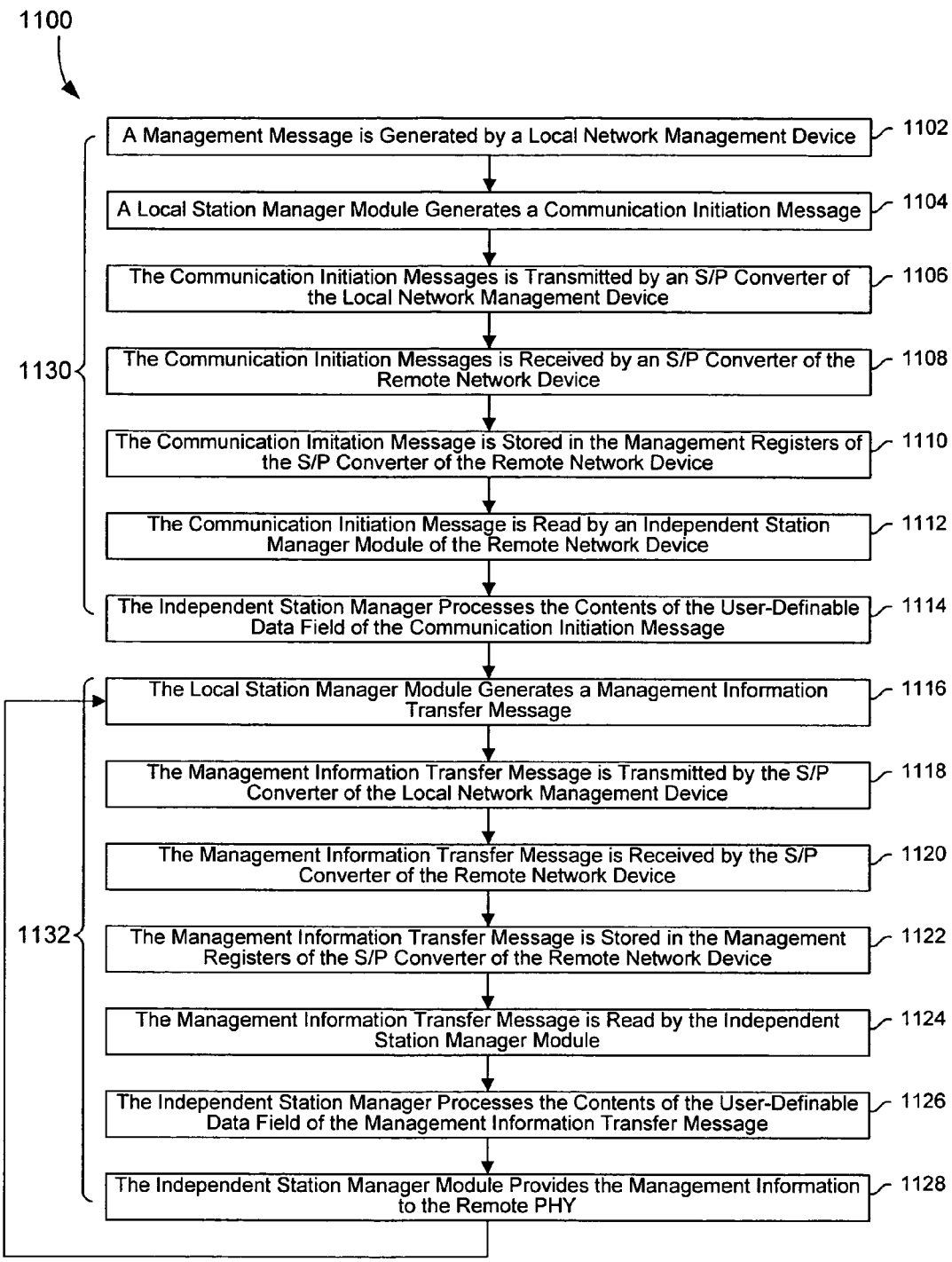

FIG. 11 provides a flowchart 1100 that illustrates operational steps corresponding to FIG. 5 (or FIG. 6) for using the management interface of the present invention to deliver management information from a local network management device to a remote PHY. The invention is not limited to this operational description. Rather, it will be apparent to persons skilled in the relevant art(s) from the teachings herein that other operational control flows are within the scope and spirit of the present invention. In the following discussion, the steps in FIG. 11 are described.

At step 1102, a management message is generated by a local network management device. The management message can be automatically generated, for example, by a MAC or a local station manager module. Alternatively, the management message can be generated by a user in communication with the local network management device (i.e., through a local or a remote user terminal). The management message includes management information intended for a remote PHY or a remote network device. The management message can be, for example, a management command or a request for management information.

At step 1104, the local station manager module generates a communication initiation message. The communication initiation message is formatted according to a predefined communications protocol governing operation of the communications network (i.e., the local network management device and the remote network device). Specifically, the communication initiation message is formatted according to a message template reserved for customization by an Auto-Negotiation routine employed by S/P converters of the local network management device and the remote network device. The communication initiation message contains a user-definable data field. The user-definable data field uses a coded bit sequence to specify the type and size of the management message to be delivered. Alternatively, the user-definable data field contains the management message or a portion of the management message. In one aspect of the present invention, the message template is the Message Page 6 Next Page of the IEEE Annex 28C AN and the user-definable data field is the last twelve bit spaces of the packet. Alternatively, the message template is the Message Page 5 Next Page specified by the Annex 28C AN.

At step 1106, the communication initiation message is transmitted by the S/P converter of the local network management device. The communication initiation message is transmitted over a communications link. The communications link is an Ethernet-supported communications link.

At step 1108, the communication initiation message is received by the S/P converter of the remote network device. The communication initiation message can be transmitted through one or more intermediate network devices coupled between the local network management device and the remote network device. That is, the communication initiation message can be received and forwarded by one or more intermediate network devices for delivery to the remote network device. Further, the communication initiation message can be transmitted with management information intended for the S/P converter of the remote network device.

At step 1110, the communication initiation message is stored in the management registers of the S/P converter of the remote network device. Specifically, the communications initiation message is stored in one or more management registers.

At step 1112, the communication initiation message is read by an independent station manager module of the remote network device. Specifically, the independent station manager module reads the contents of the management registers of the S/P converter of the remote network device.

At step 1114, the independent station manager processes the contents of the user-definable data field to determine the type and size of the management message to be delivered by the local network management device. Specifically, the independent station manager module processes the coded bit sequence of the user-definable data field. By doing so, the independent station manager module is prepared to receive subsequent management information intended for delivery to the remote PHY. In this way, a management channel can be established to foster the delivery of management information from the local network management device to the remote network device. In one aspect of the invention, the contents of the user-definable data field contain management information or a portion of the management information intended for delivery to the remote PHY.

At step 1116, the local station manager module generates a management information transfer message. The management information transfer message is formatted according to a message template of an Auto-Negotiation routine employed by the S/P converters of the local network management device and the remote network device. FIG. 8 depicts a possible format of the management information transfer message. The management information transfer message contains a header and a user-definable data field. The header specifies the type of management information contained in the user-definable data field. The user-definable data field contains the management information or a portion of the management information generated by the local network management device. If the bit length of the management information is greater than the bit length of the user-definable data field, then the local station manager module will partition the management information into one or more portions for separate delivery to the remote network device.

In one aspect of the present invention, the management information transfer message is formatted according to the Next Page template of the IEEE Annex 28C AN such that the last eleven bits of the management information transfer message contains the management information or a portion of the management information.

At step 1118, the management information transfer message is transmitted by the S/P converter of the local network management device. The management information transfer message is transmitted over the communications link connecting the local network management device and the remote network device. The communications link is the same Ethernet-supported communications link used to transport the communication initiation message.

At step 1120, the management information transfer message is received by the S/P converter of the remote network device. The management information transfer message can be transmitted through one or more intermediate network devices coupled between the local network management device and the remote network device. That is, the management information transfer message can be received and forwarded by one or more intermediate network devices for delivery to the remote network device. Further, the management information transfer message can be transmitted with management information intended for the S/P converter of the remote network device.

At step 1122, the management information transfer message is stored in the management registers of the S/P converter of the remote network device. Specifically, the management information transfer message is stored in one or more management registers.

At step 1124, the management information transfer message is read by the independent station manager module. Specifically, the independent station manager module reads the contents of the management registers of the S/P converter of the remote network device to recover the management information or portion of the management information contained within the user-definable field of the management information transfer message.

At step 1126, the independent station manager processes the contents of the user-definable data field of the management information transfer message. The independent station manager module assembles the management information or portion of management information based on the coded bit sequence contained in the user-definable data field of the communication initiation message. Typically, the independent station manager module assembles the management information or portion of the management information for coherent delivery to the remote PHY. For example, the independent station manager module can assemble management information contained within multiple management information transfer messages formatted according to the Next Page template.

At step 1128, the independent station manager module provides the management information or portion of the management information to the remote PHY. Specifically, the independent station manager module writes the contents of the user-definable data field of the management information transfer message to management registers of the remote PHY. The contents of the user-definable data field can occupy one or more of the management registers of the remote PHY.

Management information provided to the remote PHY can be used, for example, to adjust the operation of the remote PHY. Alternatively, the management information provided to the remote PHY can be transferred to a remote link partner of the remote PHY.

Collectively, the steps 1102 through 1114 represent a communication initiation period 1130. The communication initiation period 1130 provides the reservation of an embedded management channel over the communications link connecting the local network management device and the remote network device. Any number of management messages can be exchanged after initializing the embedded management channel. Together, steps 1116 through 1128 represent a management information transfer period 1132. The management information transfer period 1132 provides the delivery of management information from the local network management device to the remote PHY over an embedded management channel.

Portions of the management information transfer period 1132 may be repeated to accommodate the partitioning of large management information bit sequences into one or more management information transfer messages. That is, the management information transfer period 1132 or portions of the management information transfer period 1132 may be repeated to transfer each set of management information to be conveyed. Further, portions of the management information transfer period 1132 may be repeated to accommodate the coherent assembly of a divided management information bit sequence for delivery to the remote PHY.

The communication initiation period 1130 and management information transfer period 1132 can together be repeated for each new set of management information to be conveyed. Alternatively, the communication initiation period 1130 can be implemented once to establish an embedded management channel to enable the subsequent transfer of multiple sets of management information during repeated implementation of the management information transfer period 1132.

FIG. 12 provides a flowchart 1200 that illustrates operational steps corresponding to FIG. 5 (or FIG. 6) for using the management interface of the present invention to deliver management information from a remote PHY to a local network management device. The invention is not limited to this operational description. Rather, it will be apparent to persons skilled in the relevant art(s) from the teachings herein that other operational control flows are within the scope and spirit of the present invention. In the following discussion, the steps in FIG. 12 are described.

At step 1202, a management message is generated by an independent station manager module of a remote network device. The management message is generated by accessing the contents of the management registers of a remote PHY of the remote network device. Management information stored in the management registers of the remote PHY is read and assembled by the independent station manager module to form the management message. The management information stored in the registers of the remote PHY can be automatically generated information. Alternatively, management information stored in the registers of the remote PHY can be management information received from a remote link partner coupled to the remote PHY. The management message includes management information intended for a local network management device coupled to the remote network device. The management message can be, for example, a management command or a request for management information.

At step 1204, the independent station manager module generates a communication initiation message. The communication initiation message is formatted according to a predefined communications protocol governing operation of the communications network (i.e., the local network management device and the remote network device). Specifically, the communication initiation message is formatted according to a message template reserved for customization by an Auto-Negotiation routine employed by S/P converters of the local network management device and the remote network device. The communication initiation message contains a user-definable data field. The user-definable data field uses a coded bit sequence to specify the type and size of the management message to be delivered. Alternatively, the user-definable data field contains the management message or a portion of the management message. In one aspect of the present invention, the message template is the Message Page 6 Next Page of the IEEE Annex 28C AN and the user-definable data field is the last twelve bit spaces of the packet. Alternatively, the communication initiation Next Page 700 is the Message Page 5 Next Page specified by the Annex 28C AN.

At step 1206, the communication initiation message is transmitted by the S/P converter of the remote network device. The communication initiation message is transmitted over a communications link. The communications link is an Ethernet-supported communications link.

At step 1208, the communication initiation message is received by the S/P converter of the local network management device. The communication initiation message can be transmitted through one or more intermediate network devices coupled between the remote network device and the local network management device. That is, the communication initiation message can be received and forwarded by one or more intermediate network devices for delivery to the local network management device. Further, the communication initiation message can be transmitted with management information intended for the S/P converter of the local network management device.

At step 1210, the communication initiation message is stored in the management registers of the S/P converter of the local network management device. Specifically, the communications initiation message is stored in one or more management registers.

At step 1212, the communication initiation message is read by a station manager module of the local network management device. Specifically, the station manager module reads the contents of the management registers of the S/P converter of the local network management device.

At step 1214, the station manager processes the contents of the user-definable data field to determine the type and size of the management message to be delivered by the remote network device. Specifically, the station manager module processes the coded bit sequence of the user-definable data field. By doing so, the station manager module is prepared to receive subsequent management information intended for delivery to the station manager module. In this way, a management channel can be established to foster the delivery of management information from the remote network device to the local network management device. In one aspect of the invention, the contents of the user-definable data field contain management information or a portion of the management information intended for delivery to the station manager module.

At step 1216, the remote network device generates a management information transfer message. The management information transfer message is formatted according to a message template of an Auto-Negotiation routine employed by the S/P converters of the local network management device and the remote network device. FIG. 8 depicts a possible format of the management information transfer message. The management information transfer message contains a header and a user-definable data field. The header specifies the type of management information contained in the user-definable data field. The user-definable data field contains the management information or a portion of the management information generated by the remote network device. If the bit length of the management information is greater than the bit length of the user-definable data field, then the remote network device partitions the management information into one or more portions for separate delivery to the local network management device.

In one aspect of the present invention, the management information transfer message is formatted according to the Next Page template of the IEEE Annex 28C AN such that the last eleven bits of the management information transfer message contains the management information or a portion of the management information.

At step 1218, the management information transfer message is transmitted by the S/P converter of the remote network device. The management information transfer message is transmitted over the communications link connecting the local network management device and the remote network device. The communications link is the same Ethernet-supported communications link used to transport the communication initiation message.

At step 1220, the management information transfer message is received by the S/P converter of the local network management device. The management information transfer message can be transmitted through one or more intermediate network devices coupled between the local network management device and the remote network device. That is, the management information transfer message can be received and forwarded by one or more intermediate network devices for delivery to the remote network device. Further, the management information transfer message can be transmitted with management information intended for the S/P converter of the local network management device.

At step 1222, the management information transfer message is stored in the management registers of the S/P converter of the local network management device. Specifically, the management information transfer message is stored in one or more management registers.

At step 1224, the management information transfer message is read by the station manager module. Specifically, the independent station manager module reads the contents of the management registers of the S/P converter of the local network management device to recover the management information or portion of the management information contained within the user-definable field of the management information transfer message.

At step 1226, the station manager processes the contents of the user-definable data field of the management information transfer message. The station manager module assembles the management information or portion of management information based on the coded bit sequence contained in the user-definable data field of the communication initiation message. Often, the station manager module assembles the management information or portion of the management information for coherent delivery to a MAC of the local network management device. For example, the station manager module can assemble management information contained within multiple management information transfer messages formatted according to the Next Page template.

At step 1228, the station manager module provides the management information or portion of the management information to the MAC. Management information provided to the MAC can be used, for example, to adjust the operation of the MAC or the local network management device. Alternatively, the management information provided to the MAC can be further transferred to a user terminal coupled to the MAC.

Collectively, the steps 1202 through 1214 represent a communication initiation period 1230. The communication initiation period 1230 provides the reservation of an embedded management channel over the communications link connecting the local network management device and the remote network device. Together, steps 1216 through 1228 represent a management information transfer period 1232. The management information transfer period 1232 provides the delivery of management information from the remote PHY to the local station manger module over an embedded management channel.

Portions of the management information transfer period 1232 may be repeated to accommodate the partitioning of large management information bit sequences into one or more management information transfer messages. That is, the management information transfer period 1232 or portions of the management information transfer period 1232 may be repeated to transfer each set of management information to be conveyed. Further, portions of the management information transfer period 1232 may be repeated to accommodate the coherent assembly of a divided management information bit sequence for delivery to the MAC.

The communication initiation period 1230 and management information transfer period 1232 can together be repeated for each new set of management information to be conveyed. Alternatively, the communication initiation period 1230 can be implemented once to establish an embedded management channel to enable the subsequent transfer of multiple sets of management information during repeated implementation of the management information transfer period 1232.

Together, the operational steps illustrated by the flowcharts 1100 and 1200 can provide the bidirectional exchange of management information between a local network management device and a remote network device connected by an S/P converter interface. For example, the operational steps illustrated by the flowcharts 1100 and 1200 can be implemented sequentially in tandem. Specifically, management information can be shared between a local station manager module of the local management network device and a remote PHY of the remote network device. A management communication interface using an embedded management channel is established to foster remote PHY Auto-Negotiation. Overall, the local station manager module is provided a mechanism to both monitor and adjust the operational characteristics of the remote PHY to ensure optimal operation between a remote link partner, the remote PHY, and the local network device.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. In a communications network having a first network device and a second network device, operating according to a predefined protocol, a method of transferring a management message from a local network management device that is separate from the second network device, to a remote physical layer device (PHY) of a remote network device in the first network device, the remote network device further including a remote communications interface and an independent station manager module, the method comprising:

generating a management information transfer message including the management message, wherein the management message is formatted according to a message template of an Auto-Negotiation (AN) routine between the first network device and the local network management device;

transmitting the management information transfer message from the local network management device to one or more management registers of the remote communications interface in the remote network device;

reading the management information transfer message from the one or more management registers and unpacking the management message using the independent station manager module of the remote network device; and writing the management message to the remote PHY.

2. The method of claim 1, wherein the generating comprises:

formatting the management information transfer message according to a Next Page template of the Institute of Electrical and Electronics Engineers (IEEE) Annex 28C AN routine.

3. The method of claim 2, wherein the formatting comprises:

placing the management message into a user-definable field of the management information transfer message.

4. The method of claim 1, wherein the transmitting comprises:
provaiding the management message to a local communications interface of the local network management device.

5. The method of claim 1, wherein the transmitting comprises:
transmitting the management information transfer message during an AN period of the local communications interface.

6. The method of claim 1, wherein the transmitting comprises:
transmitting the management information transfer message through one or more intermediate network devices.

7. The method of claim 1, further comprising:
generating a communication initiation message formatted according to a message template of the AN routine of the communications network reserved for customization prior to the generating the management information transfer message, wherein the communication initiation message contains a user-definable data field for providing an indication of the management message to be transferred.

8. The method of claim 1, wherein the management message includes instructions that are in addition to the AN routine.

9. In a communications network operating according to a predefined protocol, a method for transferring a management message from a first remote network device to a local station manager module of a local network management device, comprising:
using an independent station manager module that is distinct from both a remote physical layer device (PHY) and a remote communications interface of the remote network device to generate a management information transfer message containing the management message, formatted according to a message template of an Auto-Negotiation (AN) routine between the first remote network device and the local network management device; and
transmitting, via the remote communications interface, the management information transfer message from the first remote network device to the local station manager module for storage in one or more management registers of a local communications interface of the local network management device.

10. The method of claim 9, wherein the using comprises:
formatting the management information transfer message according to a Next Page template of the Institute of Electrical and Electronics Engineers (IEEE) Annex 28C AN routine.

11. The method of claim 10, wherein the formatting comprises:
placing the management message into a user-definable field of the management information transfer message.

12. The method of claim 9, wherein the transmitting comprises:
reading the management message from one or more registers of the remote PHY of the remote network device and writing the management message to one or more registers of the remote communications interface of the remote network device.

13. The method of claim 12, wherein the transmitting comprises:
transmitting the management information transfer message during an AN period of the remote communications interface.

14. The method of claim 9, wherein the transmitting comprises:
transmitting the management information transfer message through one or more intermediate network devices.

15. The method of claim 9, wherein the transmitting comprises:
reading the management message from the one or more registers of the local communications interface and writing the management message to one or more management registers of the local station manager module.

16. A remote network device operating according to a predefined communications protocol, comprising:
a remote physical layer device (PHY) configured to be coupled to a remote link partner;
a remote communications interface, coupled between the remote PHY and a media access controller (MAC), configured to receive management information from a local network management device, the management information being formatted in accordance with an Auto-Negotiation (AN) routine between the remote network device and the local management device; and
an independent station manager module coupled to the remote PHY by a first component of a management register interface and coupled to the remote communications interface by a second component of the management register interface, wherein
the independent station manager module provides a bi-directional exchange of the management information between the remote PHY and the remote communications interface.

17. The remote network device of claim 16, wherein the management register interface is one of:
(a) an Institute of Electrical and Electronics Engineers (IEEE) 802.3 Clause (CL) 22 Management Data Clock (MDC)/Management Data Input/Output (MDIO) interface;
(b) an IEEE 802.3 CL 45 MDC/MDIO interface;
(c) an Intelligent Interface Controller (I2C) interface;
(d) a parallel register interface;
(e) a direct register interface; and
(f) a direct set of status and control bits.

18. The remote network device of claim 16, wherein the independent station manager module is configured to read remote PHY management information stored in management registers of the remote PHY and is configured to write the remote PHY management information to management registers of the remote communications interface.

19. The remote network device of claim 18, wherein the remote PHY management information comprises management information received from the remote link partner.

20. The remote network device of claim 16, wherein the independent station manager module is configured to read remote communications interface management information stored in management registers of the remote communications interface and is configured to write the remote communications interface management information to management registers of the remote PHY.

21. The remote network device of claim 20, wherein the remote communications interface management information comprises information received from the MAC.

22. The remote network device of claim 16, wherein the independent station manager module is one of:
(a) a Field Programmable Gate Array (FPGA);
(b) a Programmable Logic Device (PLD);
(c) a microprocessor with memory;
(d) an Application Specific Integrated Circuit (ASIC); and (e) a logic module configured to provide access to management registers of the remote PHY and the remote communications interface.

23. The remote network device of claim 22, wherein the independent station manager is an imbedded component of the remote network device.

24. The remote network device of claim 22, wherein the independent station manager module is external to the remote network device.

25. The remote network device of claim 16, wherein the remote network device and the MAC are connected by a backplane.

26. The remote network device of claim 16, wherein the remote network device and the MAC are connected by a cable.

27. The remote network device of claim 16, wherein the remote communications interface is a serial-to-parallel (S/P) converter.

28. The remote network device of claim 16, wherein the first component of the management register interface is associated with a first management address and the second component of the management register interface is associated with a second management address.

29. In a communications network, a method of transferring a physical layer device (PHY) management message from a local network management device to a PHY of a remote network device, comprising:
  generating an information transfer message containing the PHY management message, wherein the PHY management message is formatted according to a message template of an auto-negotiation routine of the communications network;
  transmitting the information transfer message from the local network management device to a remote communication interface of the remote network device, via a local communications interface of the local network management device, for storage in a management register of the remote communications interface;
  reading the information transfer message from the management register using an independent station manager that is distinct from both the PHY and the remote communications interface, wherein the PHY management message is separated from information included in the information transfer message based on a customized identifier of the auto-negotiation routine between the remote network device and the local network management device; and
  transmitting the PHY management message from the independent station manager to the PHY.

30. A communications network operating according to a predefined protocol comprising:
  a first remote network device;
  a second remote network device; and
  a local network management device configured to
    generate a management message formatted according to an Auto-Negotiation (AN) routine between the first remote network device and the local network management device, and
    transmit the management message to a communications interface of the first remote network device,
  the first remote network device further including,
    a remote physical layer device (PHY); and
    a station manager module configured to read the management message from the communications interface, and to write the management message to the PHY, the management message including operation information of the PHY or the communications interface.

* * * * *

UNITED STATES PATENT AND TRADEMARK OFFICE
CERTIFICATE OF CORRECTION

PATENT NO. : 8,441,957 B2
APPLICATION NO. : 11/272148
DATED : May 14, 2013
INVENTOR(S) : Baumer et al.

Page 1 of 1

It is certified that error appears in the above-identified patent and that said Letters Patent is hereby corrected as shown below:

In the Claims:

Column 20
Lines 44-45, Claim 1, please replace "management message" with --management information includes operation information of the PHY or the remote communications interface, and the management message--.

Column 21
Line 36, Claim 9, please replace "containing" with --that includes operation information of the PHY or the remote communications interface, and contains--.

Column 22
Lines 19-20, Claim 16, please replace "information being" with --information including operation information of the PHY or the remote communications interface and being--.

Signed and Sealed this
Seventeenth Day of September, 2013

Teresa Stanek Rea
*Deputy Director of the United States Patent and Trademark Office*